US008600225B2

(12) United States Patent
Kato

(10) Patent No.: US 8,600,225 B2
(45) Date of Patent: Dec. 3, 2013

(54) ELECTRONIC DEVICE, CONNECTION DETECTION METHOD AND CONNECTION DETECTION SYSTEM

(75) Inventor: Makoto Kato, Osaka (JP)

(73) Assignee: Sony Corporation (JP)

( * ) Notice: Subject to any disclaimer, the term of this patent is extended or adjusted under 35 U.S.C. 154(b) by 52 days.

(21) Appl. No.: 13/181,580

(22) Filed: Jul. 13, 2011

(65) Prior Publication Data

US 2012/0027396 A1    Feb. 2, 2012

(30) Foreign Application Priority Data

Jul. 28, 2010    (JP) ................ P2010-169239

(51) Int. Cl.
*G03B 17/14*    (2006.01)
*G03B 17/56*    (2006.01)

(52) U.S. Cl.
USPC ............ 396/58; 396/544; 396/427; 396/303; 348/158

(58) Field of Classification Search
USPC .................... 396/58, 303, 427, 532, 544
See application file for complete search history.

(56) References Cited

U.S. PATENT DOCUMENTS

| | | | | |
|---|---|---|---|---|
| 4,427,280 A | * | 1/1984 | Iwashita et al. ............... | 396/303 |
| 5,463,436 A | * | 10/1995 | Shintani et al. ................. | 396/58 |
| 5,943,169 A | * | 8/1999 | Okada ........................... | 359/557 |
| 6,167,208 A | * | 12/2000 | Sato ............................... | 396/532 |
| 6,392,702 B1 | * | 5/2002 | Arai et al. ..................... | 348/335 |
| 6,845,218 B2 | * | 1/2005 | Miyasaka et al. ............. | 396/301 |
| 7,599,617 B2 | | 10/2009 | Tokiwa et al. | |
| 2009/0103778 A1 | * | 4/2009 | Yoshizumi et al. ........... | 382/103 |

FOREIGN PATENT DOCUMENTS

| | | | |
|---|---|---|---|
| JP | 2007-101656 A | | 4/2007 |
| JP | 2008219369 A | * | 9/2008 |

\* cited by examiner

*Primary Examiner* — Clayton E LaBalle
*Assistant Examiner* — Leon W Rhodes, Jr.
(74) *Attorney, Agent, or Firm* — Lerner, David, Littenberg, Krumholz & Mentlik, LLP

(57) ABSTRACT

Disclosed herein is an electronic device connected to a camera main body and having an actuator, the electronic device including: a detection terminal adapted to come into contact with a terminal used by the camera main body to detect the connection to the electronic device when the electronic device is connected to the camera main body; a detection section adapted to detect the voltage of the detection terminal; a connection detection section adapted to detect the connection status to the camera main body based on the change in the voltage detected by the detection section; and a control section adapted to control the operation of the actuator based on the connection or disconnection to or from the camera main body detected by the connection detection section.

4 Claims, 12 Drawing Sheets

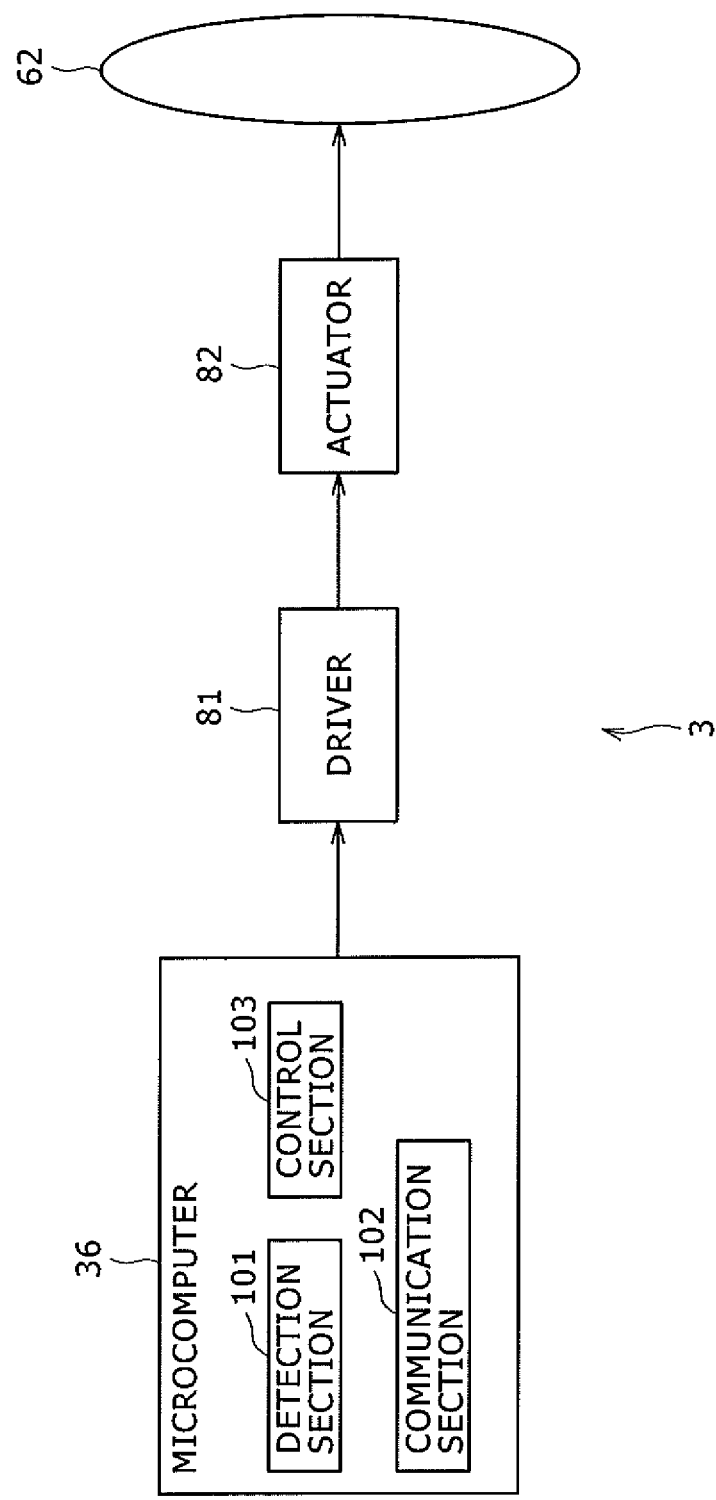

FIG.10A
DISCONNECTION  RESET
SOURCE VOLTAGE
RESET VOLTAGE
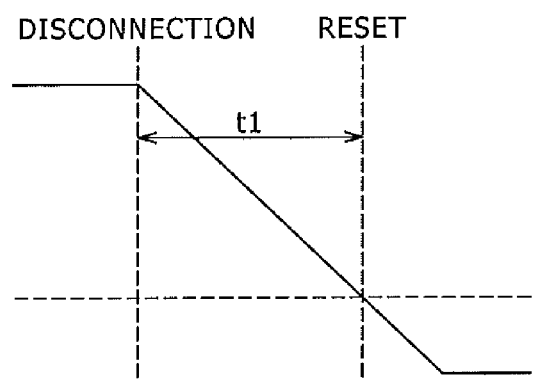
FIG.10B
CONNECTION STATUS
DISCONNECTED
CONNECTED
FIG.10C
GATE VOLTAGE
$V_1$
0
FIG.10D
INPUT VOLTAGE OF THE MICROCOMPUTER
HIGH
LOW
FIG.10E
TERMINATION PROCESS
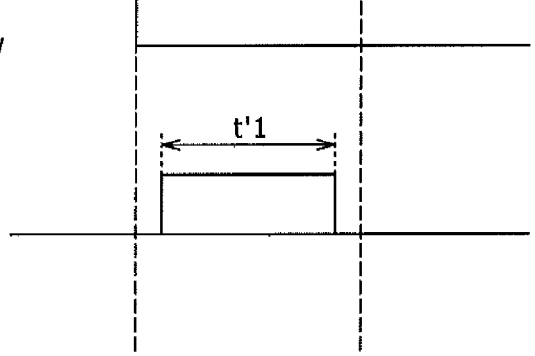

ELECTRONIC DEVICE, CONNECTION DETECTION METHOD AND CONNECTION DETECTION SYSTEM

CROSS-REFERENCE TO RELATED APPLICATION

The present Application claims priority from Japanese Patent Application No. JP 2010-169239 filed in the Japanese Patent Office on Jul. 28, 2010, the entire content of which is incorporated herein by reference.

BACKGROUND

The present disclosure relates to an electronic device, connection detection method and connection detection system and, more particularly, to an electronic device capable of quickly detecting the disconnection from the camera main body, and a connection detection method used by the same and connection detection system having the same.

Some cameras are used with a replacement lens connected to the camera main body (e.g., Japanese Patent Laid-Open No. 2007-101656 hereinafter referred to as Patent Document 1).

In the camera disclosed in Patent Document 1, all the terminals other than the power terminal are disconnected first, followed finally by the disconnection of the power terminal at the time of detachment of a replacement lens from the camera main body so as to stabilize the electrical connection between the camera main body and replacement lens.

On the other hand, a camera having a configuration as illustrated in FIG. 1 is also known to detect the connection status of a replacement lens. A camera 200 shown in FIG. 1 includes a camera main body 201 and a replacement lens 202 that is connected as necessary to the camera main body 201.

The camera main body 201 includes a power terminal 211, a detection terminal 212, a battery 213, resistors 214-1 to 214-3, a field effect transistor 215, an operational amplifier 216 and a microcomputer 217.

When the replacement lens 202 is attached to the camera main body 201, the power terminal 211 and detection terminal 212 of the camera main body 201 come into contact respectively with a power terminal 231 and a detection terminal 232 of the replacement lens 202.

DC voltage is supplied from the battery 213 to the replacement lens 202 as a result of the power terminal 211 coming into contact with the power terminal 231.

The camera main body 201 uses a detection circuit 221 to detect the connection or disconnection of the detection terminals 212 and 232.

In the example shown in FIG. 1, the detection circuit 221 includes the resistors 214-1 and 214-2, the field effect transistor 215 and the operational amplifier 216.

The output voltage of the operational amplifier 216, i.e., the input voltage to the microcomputer 217, changes with change in the gate voltage of the field effect transistor 215 connected to the detection terminal 212.

The microcomputer 217 detects the change in this input voltage, thus detecting the connection or disconnection of the replacement lens 202 to or from the camera main body 201.

A description will be given next of a connection detection circuit of the replacement lens 202. The replacement lens 202 includes the power terminal 231, the detection terminal 232, a resistor 233, a disconnection voltage detector 234, a microcomputer 235, a reset voltage detector 236 and a capacitor 237.

The replacement lens 202 uses the disconnection voltage detector 234 to detect the connection or disconnection of the replacement lens 202 to or from the camera main body 201.

When the disconnection voltage detector 234 determines that the input voltage is greater than a predetermined threshold voltage, the disconnection voltage detector 234 pulls the output voltage to the microcomputer 235 up to high level. If the disconnection voltage detector 234 determines that the input voltage is smaller than the predetermined threshold voltage, the disconnection voltage detector 234 pulls the output voltage to the microcomputer 235 down to low level.

The microcomputer 235 detects the high-to-low transition of the output voltage from the disconnection voltage detector 234, i.e., the input voltage to the microcomputer 235, thus detecting the disconnection from the camera main body 201.

On the other hand, the replacement lens 202 uses the reset voltage detector 236 to detect the timing when the microcomputer 235 is reset.

The reset voltage detector 236 detects a predetermined threshold voltage (e.g., guaranteed operating voltage) smaller than the predetermined threshold voltage detected by the disconnection voltage detector 234.

Further, when the reset voltage detector 236 determines that the input voltage is greater than the predetermined threshold voltage, the reset voltage detector 236 pulls the output voltage to the microcomputer 235 up to high level. If the reset voltage detector 236 determines that the input voltage is smaller than the predetermined threshold voltage, the reset voltage detector 236 pulls the output voltage to the microcomputer 235 down to low level.

The microcomputer 235 performs a reset when the microcomputer 235 detects the high-to-low transition of the output voltage from the reset voltage detector 236.

The capacitor 237 is charged with the DC voltage supplied from the battery 213 when the replacement lens 202 is connected to the camera main body 201. The capacitor 237 supplies power based on the charge stored therein to the microcomputer 235 only for a predetermined period of time after the replacement lens 202 is disconnected from the camera main body 201.

FIGS. 2A to 2D illustrate the timing at which the connection status is detected by the replacement lens 202 in the past.

FIG. 2A illustrates the voltage of the power terminal 231. A constant DC voltage is supplied from the battery 213 of the camera main body 201 to the power terminal 231 until the camera main body 201 is disconnected.

When the camera main body 201 is disconnected, the power terminal 231 is detached from the power terminal 211, thus allowing for the voltage stored in the capacitor 237 to be supplied to the power terminal 231.

The charge stored in the capacitor 237 decreases gradually because of its consumption by the microcomputer 235. This leads to a gradual decline in the voltage of the capacitor 237, and therefore, the voltage supplied to the microcomputer 235.

FIG. 2B illustrates the physical connection between the camera main body 201 and replacement lens 202. In FIG. 2B, the low level indicates the connection of the replacement lens 202 to the camera main body 201, and the high level indicates the disconnection of the replacement lens 202 from the camera main body 201.

FIG. 2C illustrates the input voltage of the microcomputer 235, i.e., the output voltage from the disconnection voltage detector 234. When the replacement lens 202 is disconnected from the camera main body 201, the voltage of the power terminal 231 declines gradually as illustrated in FIG. 2A.

The disconnection voltage detector 234 changes the output voltage to the microcomputer 235 from high to low level if the voltage of the power terminal 231 drops to the predetermined threshold voltage (i.e., disconnection voltage).

The microcomputer 235 detects the change in the input voltage from the disconnection voltage detector 234, thus detecting the disconnection of the replacement lens 202 from the camera main body 201.

FIG. 2D illustrates a period of time t' during which a termination process is performed. The termination process is performed within a period of time t from the detection of the disconnection to the detection of a reset voltage by the microcomputer 235.

As described with reference to FIG. 1, the reset voltage detector 236 changes the output voltage to the microcomputer 235 from high to low level if the voltage of the power terminal 231 drops to the predetermined threshold voltage (i.e., reset voltage).

The microcomputer 235 detects the change in the input voltage from the reset voltage detector 236, thus detecting the decline of the voltage to the reset voltage.

The termination process is designed specifically to stop the actuator adapted to drive the lens area of the replacement lens 202.

This makes it possible to safely stop the replacement lens 202 even if the replacement lens 202 is abruptly disconnected from the camera main body 201.

SUMMARY

As described above, the replacement lens 202 shown in FIG. 1 detects the change in the voltage of the power terminal 231, thus detecting the disconnection from the camera main body 201.

As a result, a time delay occurs between the physical disconnection of the replacement lens 202 from the camera main body 201 and the detection of the disconnection (time T in the example shown in FIG. 2A).

Accessories such as replacement lens available today to be connected to the camera main body have increased in complexity. As a result, it takes a long time to complete the termination process. Further, as a result of increase in complexity of the accessories, an inconvenience such as fault is more likely to occur in the event of an originally unexpected operation.

Still further, the increase in complexity of the accessories may lead to larger power consumption of the microcomputer adapted to control the accessories, possibly resulting in faster decline in the voltage as shown in FIG. 2A (i.e., steeper slope).

The voltage after the disconnection from the camera main body 201 varies depending on the power consumption of the microcomputer. Therefore, it is necessary to reset the microcomputer assuming the fastest decline in the voltage.

However, it may be difficult to secure the period of time t' necessary for the termination process adapted to normally terminate the accessories that have increased in complexity due to the shorter time t between the detection of the disconnection and the start of the reset.

In light of the foregoing, it is desirable to quickly detect the disconnection from the camera main body.

An electronic device according to a mode of the present disclosure is connected to a camera main body and has an actuator. The electronic device includes a detection terminal, a detection section, a connection detection section and a control section. The detection terminal comes into contact with a terminal used by the camera main body to detect the connection to the electronic device when the electronic device is connected to the camera main body. The detection section detects the voltage of the detection terminal. The connection detection section detects the connection status to the camera main body based on the change in the voltage detected by the detection section. The control section controls the operation of the actuator based on the connection or disconnection to or from the camera main body detected by the connection detection section.

The detection section may include a switching element adapted to turn ON or OFF when the electronic device and camera main body are connected to each other and turn OFF or ON when the electronic device and camera main body are disconnected from each other.

The electronic device is a replacement lens, and the actuator may drive the lens of the replacement lens.

The electronic device is a cradle on which the camera main body is placed, and the actuator may drive the camera main body in the panning or tilting direction.

A connection detection method according to the mode of the present disclosure detects the voltage of a detection terminal that comes into contact with a terminal used by a camera main body to detect the connection to an electronic device when the electronic device is connected to the camera main body. The connection detection method detects the connection status to the camera main body based on the change in the detected voltage. The connection detection method controls the operation of an actuator based on the detected connection or disconnection to or from the camera main body.

In the mode of the present disclosure, the detection terminal is provided that comes into contact with a terminal used by the camera main body to detect the connection to the electronic device when the electronic device is connected to the camera main body. The voltage of the detection terminal is detected, and the connection status to the camera main body is detected based on the change in the detected voltage. The operation of the actuator is controlled based on the detected connection or disconnection to or from the camera main body.

In a connection detection system according to the mode of the present disclosure, a camera main body includes a second detection terminal and a first detection section. The second detection terminal comes into contact with a first detection terminal of an electronic device. The first detection section detects the connection to the electronic device based on the change in the voltage of the second detection terminal. The electronic device includes an actuator, the first detection terminal, a second detection section, a connection detection section and a control section. The actuator drives the electronic device. The first detection terminal comes into contact with the second detection terminal of the camera main body. The second detection section detects the voltage of the first detection terminal. The connection detection section detects the connection status to the camera main body based on the change in the voltage detected by the second detection section. The control section controls the operation of the actuator based on the connection or disconnection to or from the camera main body detected by the connection detection section.

In the mode of the present disclosure, the second detection terminal is provided in the camera main body. The second detection terminal comes into contact with the first detection terminal of the electronic device, and the voltage of the second detection terminal is detected. On the other hand, the actuator and the first detection terminal are provided in the electronic device. The actuator drives the electronic device. The first detection terminal comes into contact with the second detection terminal of the camera main body. The voltage of the first detection terminal is detected, and the connection status to the camera main body is detected based on the change in the detected voltage. The operation of the actuator is controlled based on the detected connection or disconnection to or from the camera main body.

The mode of the present disclosure allows for quick detection of the disconnection from the camera main body.

BRIEF DESCRIPTION OF THE DRAWINGS

FIG. 5 is a block diagram illustrating a configuration example of a lens drive section of the replacement lens;

FIGS. 10A to 10E are diagrams illustrating the timing at which the connection status is detected by the replacement lens;

DETAILED DESCRIPTION OF THE PREFERRED EMBODIMENT

[Configurations of Camera Main Body 2 and Replacement Lens 3]

Figure 1:
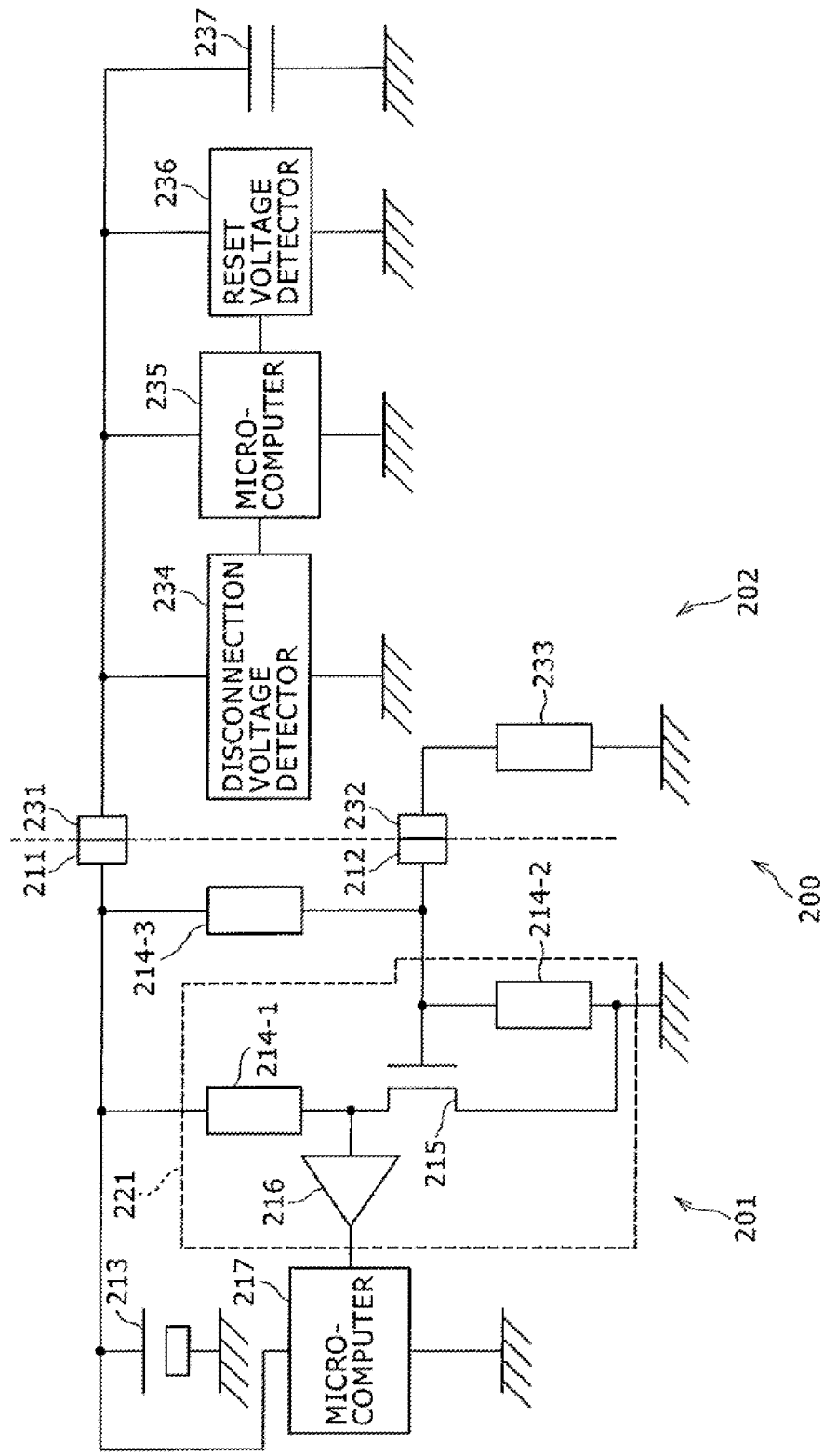
FIG. 1 is a diagram illustrating the configuration of a circuit adapted to detect the disconnection of a replacement lens from a camera main body in the past.
Figure 2A:
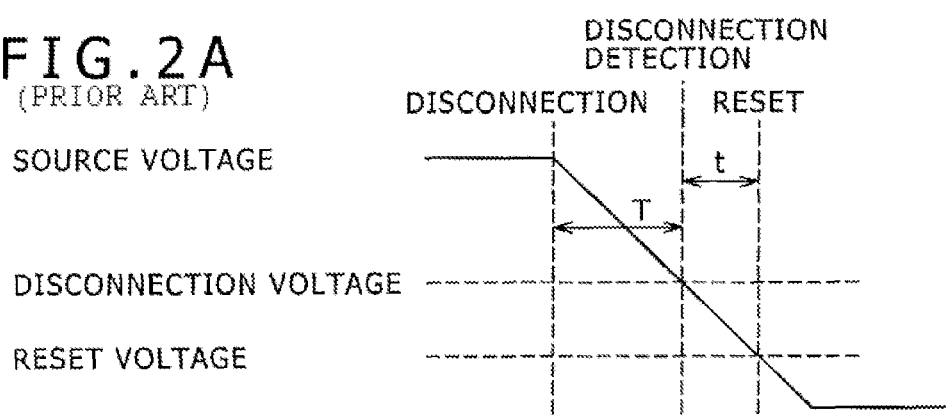
FIGS. 2A to 2D illustrate the timing at which the connection status is detected by the replacement lens in the past.
Figure 2B:
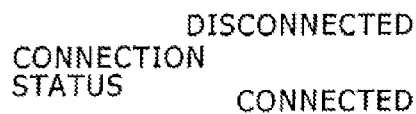
Figure 2C:
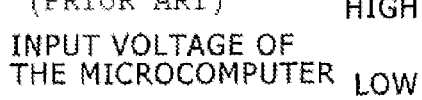
Figure 2D:
Figure 3:
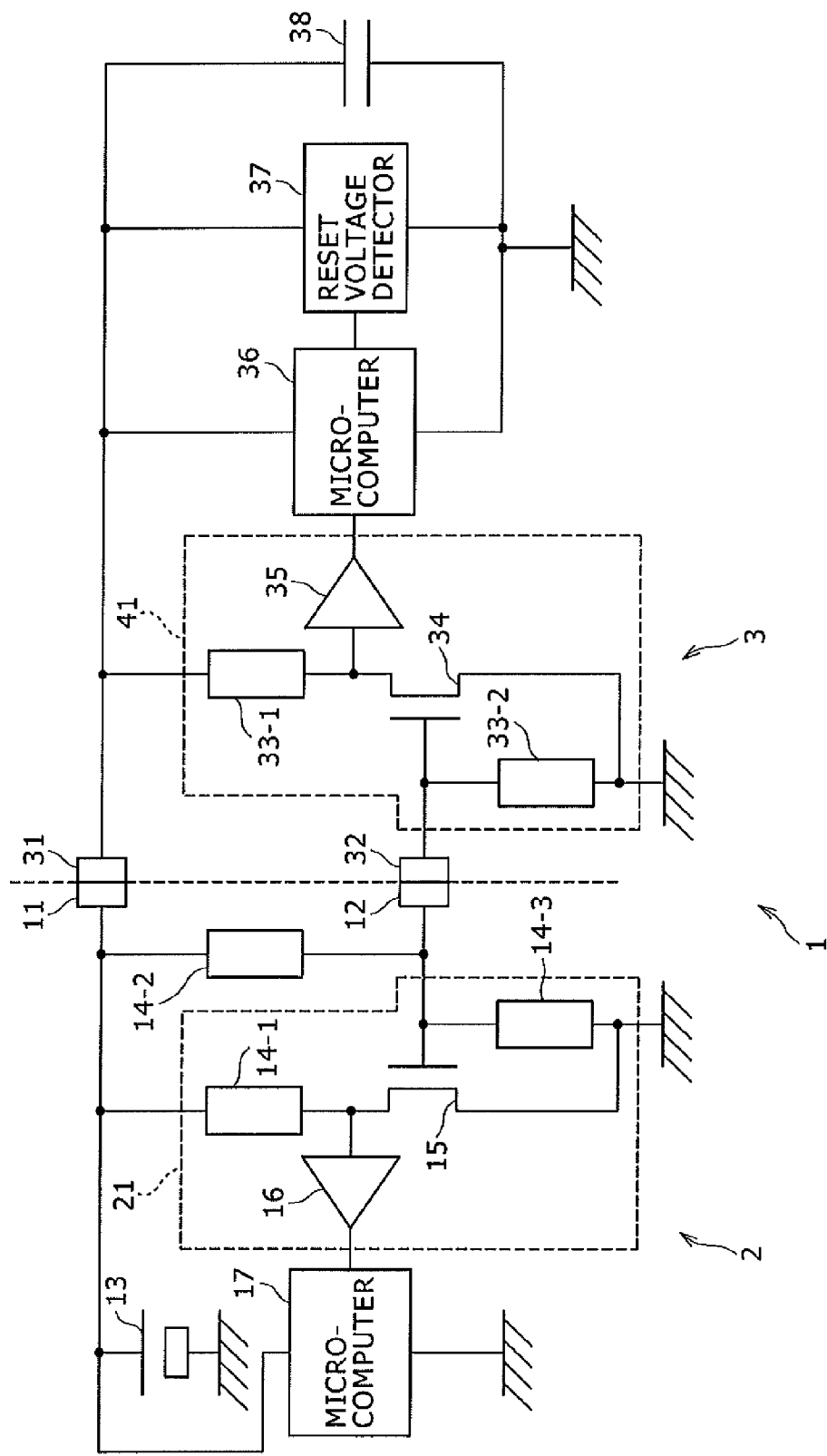
FIG. 3 is a diagram illustrating the configuration of a circuit adapted to detect the connection status between the camera main body and replacement lens according to a present embodiment.

FIG. 3 is a diagram illustrating the configuration of a circuit adapted to detect the connection status between the camera main body 2 and replacement lens 3 making up a camera 1.

A description will be given first of the connection detection circuit of the camera main body 2. The camera main body 2 includes a power terminal 11, a detection terminal 12, a battery 13, resistors 14-1 to 14-3, a field effect transistor 15, an operational amplifier 16 and a microcomputer 17.

When the replacement lens 3 is attached to the camera main body 2, the power terminal 11 and the detection terminal 12 come into contact respectively with a power terminal 31 and a detection terminal 32 of the replacement lens 3. A DC voltage is supplied from the battery 13 to the replacement lens 3 as a result of the power terminal 11 coming into contact with the power terminal 31.

The camera main body 2 uses a detection circuit 21 to detect the voltage of the detection terminal 12, thus detecting the presence or absence of contact between the detection terminals 12 and 32.

The detection circuit 21 includes the resistors 14-1 and 14-3, the field effect transistor 15 and the operational amplifier 16 as illustrated in the example of FIG. 3.

The microcomputer 17 detects the change in the input voltage from the operational amplifier 16, thus detecting the connection or disconnection of the replacement lens 3 to or from the camera main body 2.

A description will be given next of the connection detection circuit of the replacement lens 3. The replacement lens 3 includes the power terminal 31, the detection terminal 32, resistors 33-1 and 33-2, a field effect transistor 34, an operational amplifier 35, a microcomputer 36, a reset voltage detector 37 and a capacitor 38.

It should be noted that the replacement lens 3 further includes a lens 62, a driver 81 and an actuator 82 as will be described later with reference to FIG. 5. The drive 81 and actuator 82 drive the lens 62.

The replacement lens 3 uses a detection circuit 41 to detect the voltage of the detection terminal 32, thus detecting the connection or disconnection of the detection terminals 12 and 32. It should be noted that the detection circuit 41 has the same configuration as the detection circuit 21 of the camera main body 2.

That is, the detection circuit 41 includes the resistors 33-1 and 33-2, the field effect transistor 34 and the operational amplifier 35 as illustrated in the example of FIG. 3.

The microcomputer 36 detects the change in the input voltage from the operational amplifier 35, thus detecting the connection or disconnection of the replacement lens 3 and the camera main body 2.

The reset voltage detector 37 is connected to the microcomputer 36 in parallel to detect the voltage for resetting the microcomputer 36 by monitoring the voltage of the power terminal 31.

The reset voltage detector 37 detects the input voltage to the reset voltage detector 37 (i.e., source voltage supplied to the microcomputer 36) to determine whether the input voltage has declined to the reset voltage which is a predetermined threshold level.

When the reset voltage detector 37 determines that the input voltage is greater than the reset voltage, the reset voltage detector 37 pulls the output voltage to the microcomputer 36 up to high level. On the other hand, if the reset voltage detector 37 determines that the input voltage is smaller than the reset voltage, the reset voltage detector 37 pulls the output voltage to the microcomputer 36 down to low level.

The microcomputer 36 performs a reset when the microcomputer 36 detects the high-to-low transition of the output voltage from the reset voltage detector 37.

The reset voltage level of the reset voltage detector 37 is set assuming the guaranteed operating voltage for the largest power consumption of the microcomputer 36. This ensures that the microcomputer 36 is positively reset.

The capacitor 38 has its one end connected to the power terminal 31 and its other end grounded. When the replacement lens 3 is connected to the camera main body 2, the capacitor 38 is charged with the DC voltage supplied from the battery 13.

When the replacement lens 3 is disconnected from the camera main body 2, the capacitor 38 supplies power to the microcomputer 36 for a predetermined period of time. Because of the consumption of power by the microcomputer 36, the voltage of the capacitor 38 diminishes over time and eventually drops to zero.

The microcomputer 36 takes advantage of power supplied from the capacitor 38 to complete the termination process even in the event of a sudden termination of the supply of the source voltage from the camera main body 2.

Figure 4A:
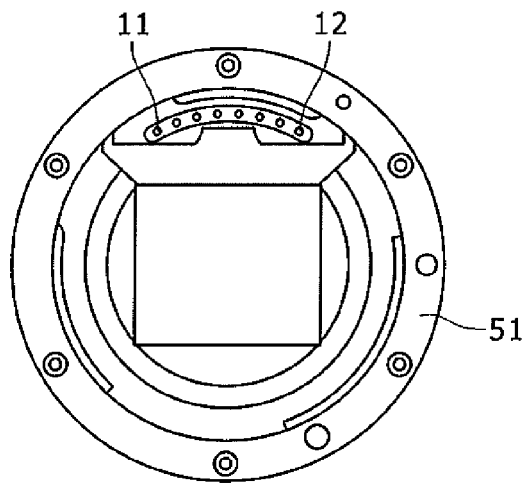
FIGS. 4A and 4B are front views illustrating the configuration of connection sections of the camera main body and replacement lens.
Figure 4B:
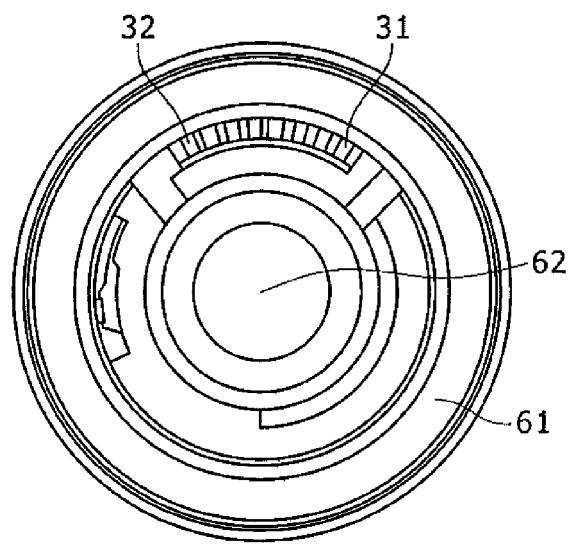

FIGS. 4A and 4B are front views illustrating the configurations of connection sections of the camera main body 2 and replacement lens 3.

FIG. 4A illustrates a front view of the connection section of the camera main body 2. A plurality of terminals including the power terminal 11 and the detection terminal 12 are provided in a mount 51 serving as the connection section of the camera main body 2.

FIG. 4B illustrates a front view of the connection section of the replacement lens 3. A plurality of terminals including the power terminal 31 and the detection terminal 32 and the lens 62 are provided in a mount 61 serving as the connection section of the replacement lens 3.

When the replacement lens 3 is attached to the camera main body 2, the mount 51 of the camera main body 2 is brought into contact with the mount 61 of the replacement lens 3. Then, the mount 61 of the replacement lens 3 is rotated in the predetermined direction, thus attaching the replacement lens 3 to the camera main body 2.

The plurality of terminals on the camera main body 2 are provided in the same number as the plurality of terminals on the replacement lens 3, with each terminal on the camera main body 2 paired with one of the terminals on the replacement lens 3. When the replacement lens 3 is attached to the camera main body 2 by rotating the mount 61 of the replacement lens 3 in the predetermined direction, the terminals of each pair are connected together, thus establishing electrical continuity.

When the replacement lens 3 is disconnected from the camera main body 2, the mount 61 of the replacement lens 3 is rotated in the direction opposite to that for attaching the replacement lens 3.

It should be noted that although, in the example shown in FIGS. 4A and 4B, the replacement lens 3 is attached to or detached from the camera main body 2 by rotating the mount 61 of the replacement lens 3, the method of connection between the camera main body 2 and replacement lens 3 is not limited to this example.

[Configuration of the Replacement Lens 3]

FIG. 5 is a block diagram illustrating a configuration example of a drive section for a lens 62 of the replacement lens 3.

The replacement lens 3 includes the microcomputer 36, imaging lens 62, actuator 82 and driver 81. The actuator 82 drives the lens 62. The driver 81 drives the actuator 82. The replacement lens 3 is controlled by the microcomputer 36.

The microcomputer 36 issues a command to the driver to operate the lens 62. In response to the operation command from the microcomputer 36, the driver 81 issues a command to the actuator 82 to control the lens 62.

The actuator 82 drives the lens 62 based on the control command from the driver 81. This allows, for example, for the focus position of the lens 62 to be adjusted.

A description will be given next of the capability of the microcomputer 36 to drive the lens 62. The microcomputer 36 includes a detection section 101, a communication section 102 and a control section 103.

It should be noted that the different blocks of the microcomputer 36 can exchange signals and data with each other as necessary.

The detection section 101 of the microcomputer 36 detects the connection status to the camera main body 2 and the reset timing based on the changes in the output voltages from the detection circuit 41 and the reset voltage detector 37. The communication section 102 issues a command to the driver 81, thus controlling the operation of the actuator 82. The control section 103 resets the microcomputer 36.

[Operation of the Detection Circuit 21 of the Camera Main Body 2]

Figure 6:
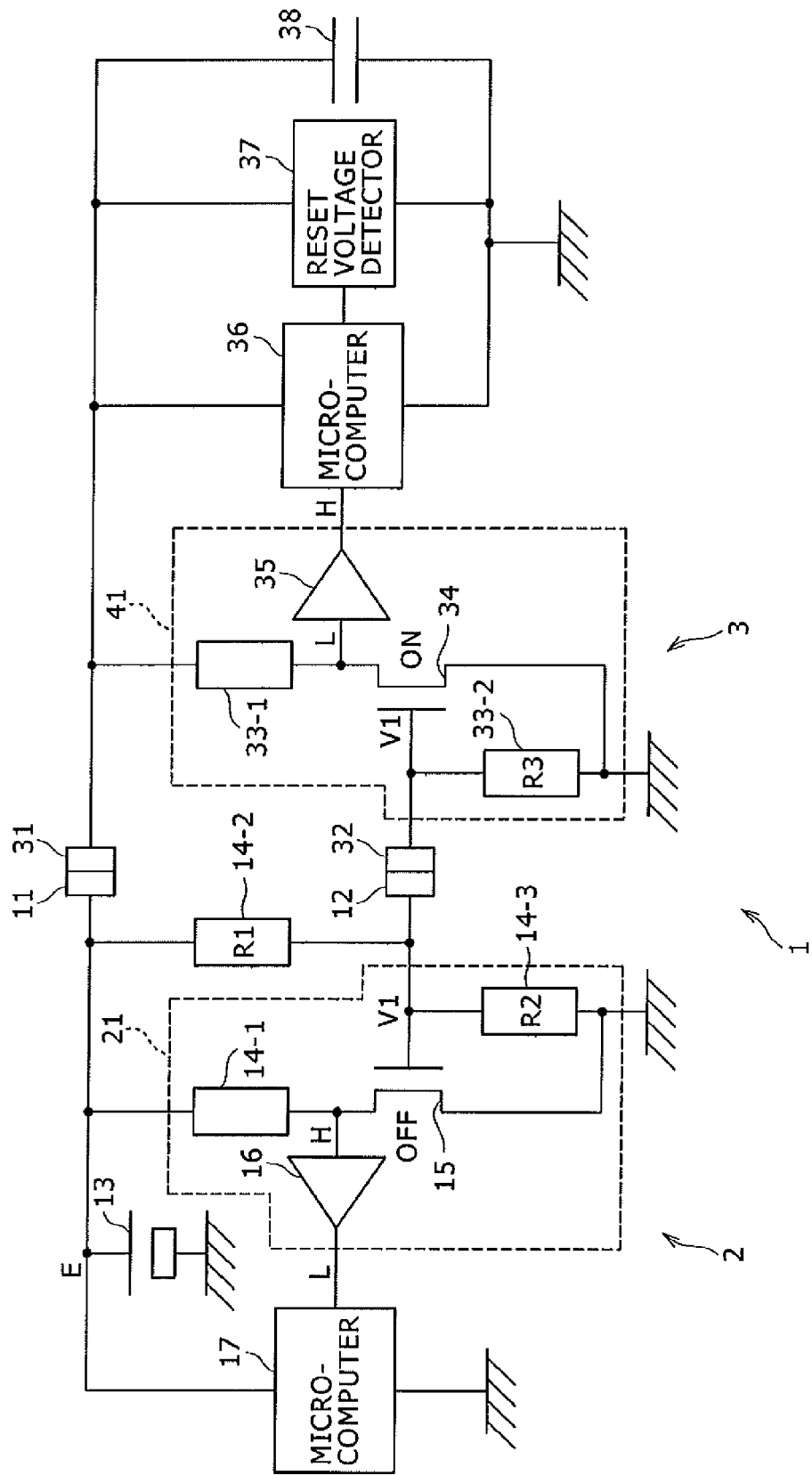
FIG. 6 is a diagram describing the operation of a detection circuit when the camera main body and replacement lens are connected to each other.

FIG. 6 is a diagram describing the operation of the detection circuit 21 when the camera main body 2 and replacement lens 3 are connected to each other.

The field effect transistor 15 has its gate connected to the resistors 14-2 and 14-3 and detection terminal 12, its drain connected to the resistor 14-1 and operational amplifier 16 and its source grounded.

Letting the voltage of the battery 13 be denoted by E and the resistances of the resistors 14-2, 14-3 and 33-2 by R1, R2 and R3, respectively, a gate voltage V1 of the field effect transistor 15 is expressed by Equation (1) shown below.

$$V1 = \frac{\frac{R2 \cdot R3}{R2 + R3}}{R1 + \frac{R2 \cdot R3}{R2 + R3}} E \qquad (1)$$

Assuming that the gate voltage V1 is smaller than a threshold voltage Vth of the field effect transistor 15 (i.e., V1<Vth), the field effect transistor 15 serving as a switching element is OFF.

Therefore, the operational amplifier 16 is supplied with the voltage E from the battery 13 via the resistor 14-1. As a result, the input voltage of the operational amplifier 16 is high (shown as "H" in FIG. 6).

The operational amplifier 16 makes up an inverting amplifier. Because its input voltage is high, its output voltage is low (shown as "L" in FIG. 6). Therefore, the voltage fed to the microcomputer 17 is low.

This allows for the microcomputer 17 to detect the attachment of the replacement lens 3 to the camera main body 2.

It should be noted that although an inverting amplifier is used as the operational amplifier 16, the present disclosure is not limited to this example so long as an amplifier having similar capability is used. On the other hand, the operational amplifier 16 is not necessary so long as the change in the gate voltage of the field effect transistor 15 can be detected by the microcomputer 17.

[Operation of the Detection Circuit 21 of the Disconnected Camera Main Body 2]

Figure 7:
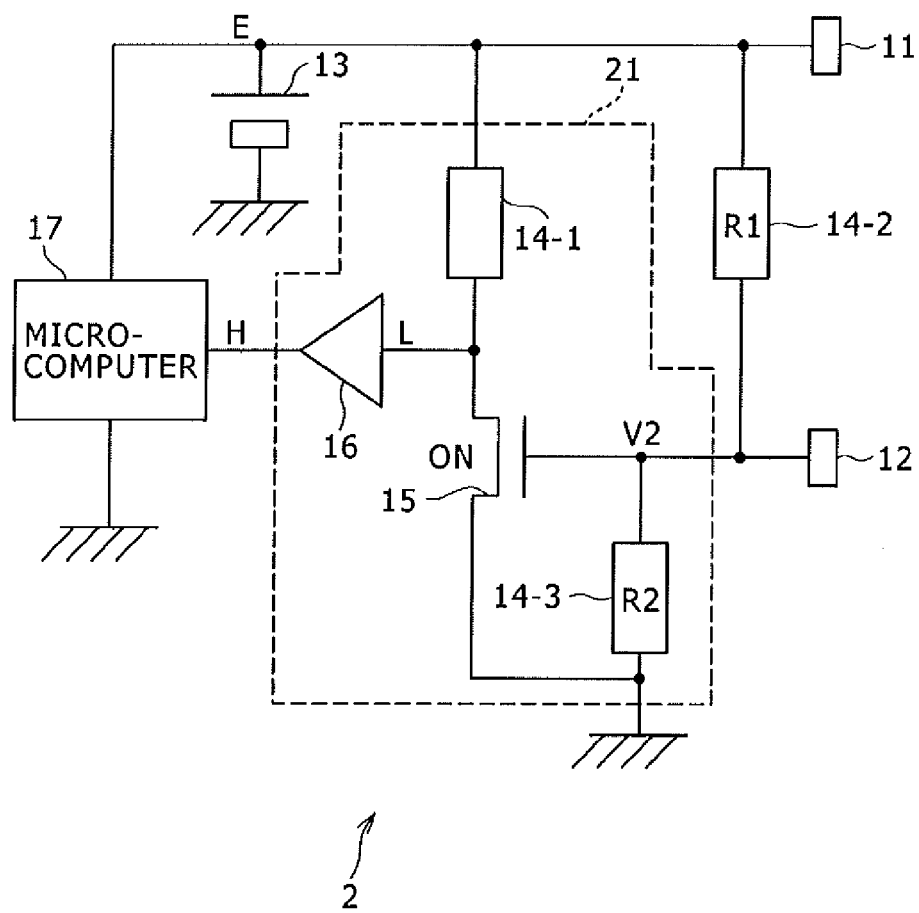
FIG. 7 is a diagram illustrating the circuit configuration of the camera main body when the camera main body and replacement lens are disconnected from each other.

A description will be given next of the operation of the detection circuit 21 of the disconnected camera main body 2 with reference to FIG. 7.

When the replacement lens 3 is disconnected from the camera main body 2, the detection terminal 12 is disconnected from the detection terminal 32. As a result, a gate voltage V2 of the field effect transistor 15 is expressed by Equation (2) shown below.

$$V2 = \frac{R2}{R1 + R2} E \qquad (2)$$

From Equations 1 and 2, the gate voltage V2 is greater than the gate voltage V1 (i.e., V2>V1). Assuming that the gate voltage V2 is greater than the threshold voltage Vth of the field effect transistor 15 (i.e., V2>Vth), the field effect transistor 15 serving as a switching element is ON.

Because the source of the field effect transistor 15 is grounded, the input voltage of the operational amplifier 16 is low. As a result, the output voltage of the operational amplifier 16 is high.

Therefore, the voltage fed to the microcomputer 17 is high. This allows for the microcomputer 17 to detect the disconnection of the replacement lens 3 from the camera main body 2. As a result, the image capture operation is inhibited.

[Detection Timing of the Connection Status by the Camera Main Body 2]

The connection status is detected by the camera main body 2 described above at the timing as shown in FIGS. 8A to 8C.

Figure 8:
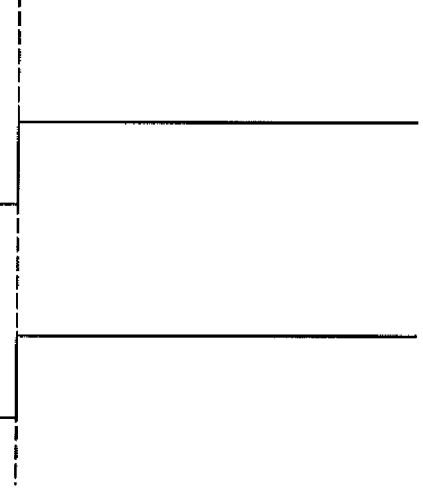
FIGS. 8A to 8C are diagrams illustrating the timing at which the connection status is detected by the camera main body.

FIGS. 8A to 8C are diagrams illustrating the timing at which the connection status is detected by the camera main body 2.

FIG. 8A illustrates the physical connection between the camera main body 2 and replacement lens 3. In FIG. 8A, the low level indicates the connection of the replacement lens 3 to the camera main body 2, and the high level indicates the disconnection of the replacement lens 3 from the camera main body 2.

FIG. 8B illustrates the gate voltage level of the field effect transistor 15.

When the camera main body 2 and replacement lens 3 are connected to each other, the gate voltage is equal to V1 as described with reference to FIG. 6. When the replacement lens 3 is disconnected, the gate voltage is equal to V2 (V1<V2) as described with reference to FIG. 7.

FIG. 8C illustrates the input voltage fed from the detection circuit 21 (i.e., operational amplifier 16) to the microcomputer 17.

When the camera main body 2 and replacement lens 3 are connected to each other, the input voltage is low as described with reference to FIG. 6. When the replacement lens 3 is disconnected, the input voltage is high as described with reference to FIG. 7.

When the connection status of the replacement lens 3 changes from connection to disconnection, the input voltage of the microcomputer 17 also changes at the same time.

Therefore, the camera main body 2 detects the change in the input voltage fed from the detection circuit 21 to the microcomputer 17, thus detecting the disconnection from the replacement lens 3 more quickly.

[Operation of the Detection Circuit 41 of the Connected Replacement Lens 3]

A description will be given next of the operation of the detection circuit 41 of the connected replacement lens 3 with reference to FIG. 6.

The field effect transistor 34 has its gate connected to the resistor 33-2 and the detection terminal 32, its drain connected to the resistor 33-1 and the operational amplifier 35, and its source grounded.

On the other hand, the resistor 33-2 has its one end connected to the detection terminal 32 and the gate of the field effect transistor 34 and its other end grounded.

The gate of the field effect transistor 34 of the replacement lens 3 is connected to the gate of the field effect transistor 15 of the camera main body 2 via the detection terminals 12 and 32.

Therefore, the gate voltage of the field effect transistor 34 of the replacement lens 3 is equal to the gate voltage V1 of the field effect transistor 15 of the camera main body 2.

Assuming that the gate voltage V1 is greater than a threshold voltage V'th (i.e., V1>V'th) of the field effect transistor 34, the field effect transistor 34 serving as a switching element is ON.

Because the source of the field effect transistor 34 is grounded, the input voltage of the operational amplifier 35 is low. Because the operational amplifier 35 makes up an inverting amplifier, the output voltage of the operational amplifier 35 is high.

Therefore, the voltage fed to the microcomputer 36 is high. As a result, the microcomputer 36 detects the attachment of the replacement lens 3 to the camera main body 2.

It should be noted that although an inverting amplifier is used as the operational amplifier 35, the present disclosure is not limited to this example so long as an amplifier having similar capability is used. On the other hand, the operational amplifier 35 is not necessary so long as the change in the gate voltage of the field effect transistor 34 can be detected by the microcomputer 36.

[Operation of the Detection Circuit 41 of the Disconnected Replacement Lens 3]

A description will be given next of the operation of the detection circuit 41 of the disconnected replacement lens 3 with reference to FIG. 9.

When the replacement lens 3 is disconnected from the camera main body 2, the gate of the field effect transistor 34 is grounded via the resistor 33-2. As a result, the gate voltage is zero.

Because the gate voltage of the field effect transistor 34 is zero which is smaller than the threshold voltage V'th (i.e., V'th>0), the field effect transistor 34 is OFF.

Therefore, a voltage is fed to the operational amplifier 35 via the capacitor 38 and the resistor 33-1. As a result, the input voltage of the operational amplifier 35 is high (shown as "H" in FIG. 9).

Figure 9:
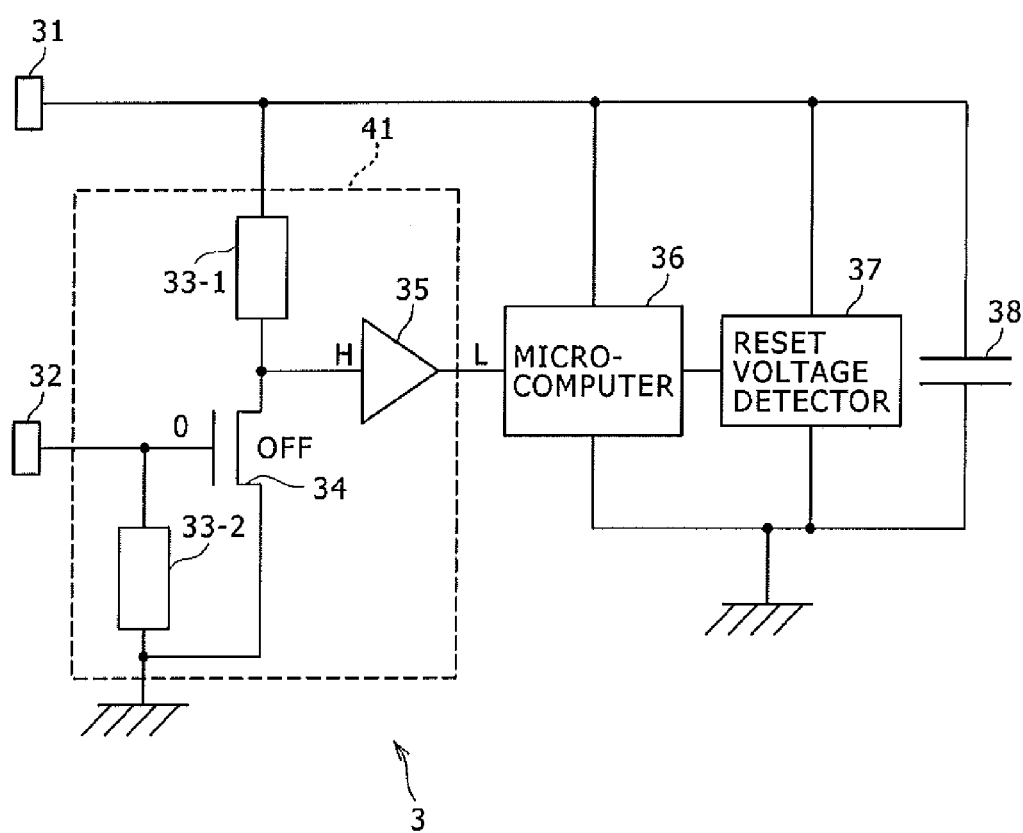
FIG. 9 is a diagram illustrating the circuit configuration of the replacement lens when the camera main body and replacement lens are disconnected from each other.

Because the input voltage of the operational amplifier 35 is high, the output voltage thereof is low (shown as "L" in FIG. 9). Therefore, the input voltage fed to the microcomputer 36 is low. As a result, the microcomputer 36 detects the disconnection of the replacement lens 3 from the camera main body 2.

[Detection Timing of the Connection Status by the Replacement Lens 3]

The connection status is detected by the replacement lens 3 described above at the timing as shown in FIGS. 10A to 10E.

FIGS. 10A to 10E are diagrams illustrating the timing at which the connection status is detected by the replacement lens 3.

FIG. 10A illustrates the voltage supplied to the microcomputer 36.

When the replacement lens 3 is connected to the camera main body 2, the DC voltage E is supplied from the battery 13 of the camera main body 2 to the replacement lens 3 via the power terminals 11 and 31 as described with reference to FIG. 6.

When the camera main body 2 is disconnected, the power stored in the capacitor 38 is supplied as described with reference to FIG. 9.

The power stored in the capacitor 38 decreases gradually because of its consumption mainly by the microcomputer 36. This leads to a gradual decline in the voltage supplied from the capacitor 38 to the microcomputer 36. This condition is shown in FIG. 10A.

On the other hand, the reset voltage detector 37 changes the output voltage to the microcomputer 36 from high to low level if the voltage supplied to the microcomputer 36 drops to the predetermined reset voltage.

The microcomputer 36 detects the change in the input voltage from the reset voltage detector 37, thus detecting the decline of the supplied voltage to the reset voltage. At this time, the microcomputer 36 performs a reset.

FIG. 10B illustrates the physical connection between the camera main body 2 and replacement lens 3. In FIG. 10B, the low level indicates the connection of the replacement lens 3 to the camera main body 2, and the high level indicates the disconnection of the replacement lens 3 from the camera main body 2.

FIG. 10C illustrates the gate voltage level of the field effect transistor 34.

When the camera main body 2 and replacement lens 3 are connected to each other, the gate voltage is equal to V1 as described with reference to FIG. 6. When the camera main body 2 is disconnected, the gate voltage is equal to zero as described with reference to FIG. 9.

FIG. 10D illustrates the input voltage fed from the detection circuit 41 (i.e., operational amplifier 35) to the microcomputer 36.

When the camera main body 2 and replacement lens 3 are connected to each other, the input voltage is high as described with reference to FIG. 6. When the camera main body 2 is disconnected, the input voltage is low as described with reference to FIG. 9.

FIG. 10E illustrates a period of time t'1 during which the termination process is performed. The termination process is performed within a period of time t1 from the detection of the disconnection from the camera main body 2 to the detection of the reset voltage by the microcomputer 36.

As described above, the detection circuit 41 detects the voltage of the detection terminal 32 rather than the voltage of the power terminal 31, thus detecting the disconnection from the camera main body 2 more quickly. This makes it possible to extend the period of time t'1 for the termination process, positively completing the termination process.

Further, the detection terminal 32 is used that is in contact with the detection terminal 12 used by the camera main body 2 to detect the connection status. As a result, it is not necessary to add any new terminal, thus making the detection circuit 41 applicable to a larger number of camera types and allowing for incorporation of the connection detection circuit at lower cost.

[Termination Process]

Figure 11:
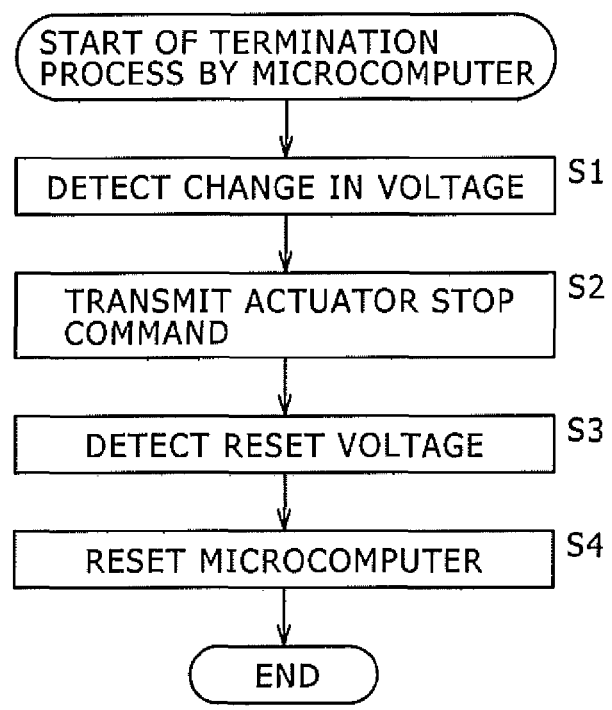
FIG. 11 is a flowchart describing a termination process performed by a microcomputer.

FIG. 11 is a flowchart describing the termination process performed by the microcomputer 36.

In step S1, the detection section 101 of the microcomputer 36 detects the change in voltage. That is, the detection section 101 monitors the output of the detection circuit 41 shown in FIG. 10D, thus detecting the high-to-low transition of the input voltage to the microcomputer 36.

When the change in voltage, i.e., the disconnection of the replacement lens 3 from the camera main body 2, is detected in step S1, the communication section 102 transmits a command to stop the actuator 82 to the driver 81 in step S2.

In response to the stop command, the driver 81 stops the actuator 82. This makes it possible to avoid an unexpected and inconvenient operation of the lens 62.

In step S3, the detection section 101 detects the reset voltage of the microcomputer 36.

That is, the reset voltage detector 37 monitors the source voltage supplied to the microcomputer 36 and outputs a low voltage to the microcomputer 36 when the source voltage is smaller than the reset voltage.

The detection section 101 detects the low voltage output from the reset voltage detector 37, thus detecting the reset voltage.

In step S4, the control section 103 resets the microcomputer 36. Following the process in step S4, the termination process of the replacement lens 3 is complete.

As described above, the microcomputer 36 detects the change in the input voltage, i.e., the disconnection from the camera main body 2, more quickly, thus stopping the operation of the actuator 82 more positively.

It should be noted that although inverting amplifiers are used as the operational amplifiers 16 and 35, non-inverting amplifier or amplifiers may be used as one or both of the operational amplifiers 16 and 35. On the other hand, the ON and OFF states of the field effect transistor 34 are opposite between when an N-channel transistor is used and when a P-channel transistor is used.

Further, although a description has been given of the replacement lens 3 as an electronic device connected to the camera main body 2 in the present embodiment, the electronic device connected to the camera may be a stand to which the camera main body 2 is set and a cradle adapted to move the camera main body 2 in the panning or tilting direction or other electronic device.

Figure 12:
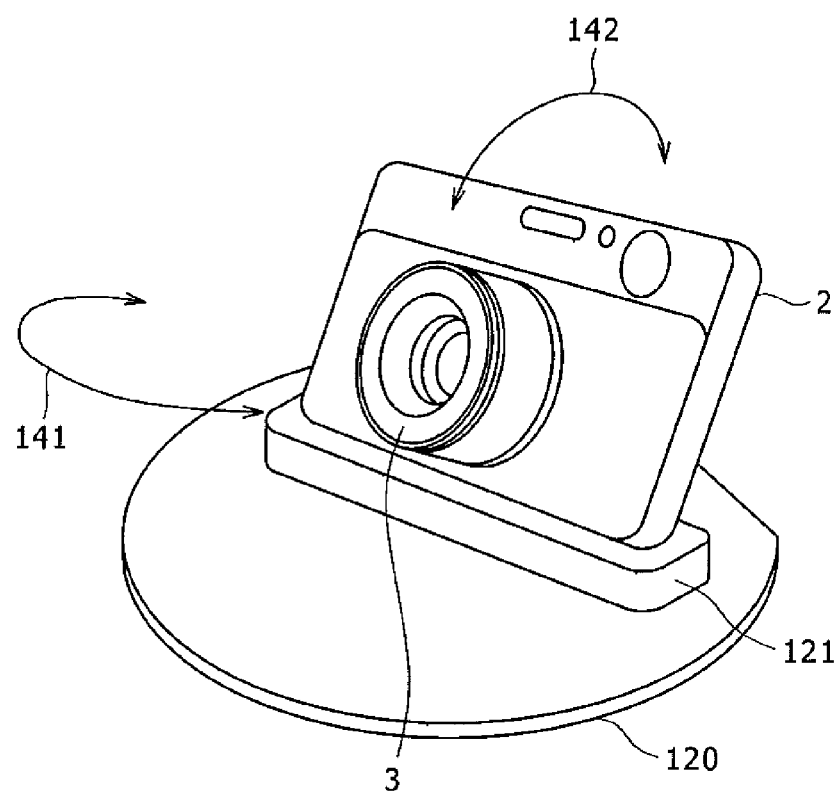
FIG. 12 is a diagram illustrating the configuration of a cradle.

FIG. 12 is a diagram illustrating the configuration of a cradle 120 as an electronic device connected to the camera main body 2. The cradle 120 is connected to the bottom portion of the camera main body 2 via a connection section 121.

The cradle 120 drives an actuator incorporated therein, thus moving the camera main body 2 connected to the connection section 121 in a panning direction 141 or a tilting direction 142. The camera 1 automatically captures images at predetermined timings.

In the present embodiment, the cradle 120 has the same components as the replacement lens 3 illustrated in FIG. 3. The camera main body 2 connected to the cradle 120 has the same components as the camera main body 2 illustrated in FIG. 3 and separately from those of the cradle 120. It should be noted, however, that the battery 13 and the microcomputer 17 are shared between the cradle 120 and camera main body 2.

On the other hand, the actuator of the cradle 120 is controlled by the microcomputer and driver as in the case shown in FIG. 5. It should be noted, however, that the actuator drives the camera main body 2 (i.e., camera 1) rather than the lens 62, with the replacement lens 3 attached thereto.

It should be noted that a camera with a fixed lens that cannot be replaced can be naturally placed on the cradle 120 and controlled in the same manner.

As described above, the present disclosure is applicable to an electronic device incorporating an actuator and adapted to stop the actuator when the electronic device is disconnected from the camera main body.

On the other hand, the term "system" refers to the overall apparatus made up of a plurality of devices and sections.

It should be understood by those skilled in the art that various modifications, combinations, sub-combinations and alterations may occur depending on design requirements and other factors insofar as they are within the scope of the appended claims or the equivalent thereof.

What is claimed is:

1. An electronic device connectable to a camera main body and having an actuator, the electronic device comprising:
   a detection terminal adapted to come into contact with a first terminal used by the camera main body to detect connection to the electronic device when the electronic device is connected to the camera main body;
   a power terminal to come into contact with a second terminal used by the camera main body to transfer power to the electronic device when the electronic device is connected to the camera main body;
   a detection section adapted to detect the voltage of the detection terminal;

a connection detection section adapted to detect the connection status to the camera main body based on the change in the voltage detected by the detection section; and a control section adapted to control the operation of the actuator based on one of the connection to and the disconnection from the camera main body detected by the connection detection section, in which the electronic device is a replacement lens and the actuator drives a lens of the replacement lens, in which the detection terminal and the power terminal are separate from each other, and in which the connection detection section detects the connection status to the camera main body based on the change in the voltage of the detection terminal detected by the detection section such that the connection status is not based on a connection of the power terminal to the second terminal.

2. The electronic device of claim 1, wherein the detection section includes:

a switching element adapted to one of turn ON and turn OFF when the electronic device and camera main body are connected to each other and one of turn OFF and turn ON when the electronic device and camera main body are disconnected from each other.

3. A connection detection method of an electronic device connected to a camera main body and having an actuator, the connection detection method comprising:

detecting the voltage of a detection terminal adapted to come into contact with a first terminal used by the camera main body to detect the connection to the electronic device when the electronic device is connected to the camera main body;

detecting the connection status to the camera main body based on the change in the detected voltage; and controlling the operation of the actuator based on one of the detected connection to and the detected disconnection from the camera main body, in which the electronic device has a power terminal to come into contact with a second terminal used by the camera main body to transfer power to the electronic device when the electronic device is connected to the camera main body;

in which the electronic device is a replacement lens and the actuator drives a lens of the replacement lens, in which the detection terminal and the power terminal are separate from each other, and in which the detecting the connection status step detects the connection status to the camera main body based on the change in the voltage of the detection terminal detected by the detecting the voltage step such that the connection status is not based on a connection of the power terminal to the second terminal.

4. A connection detection system for detecting the connection between a camera main body and electronic device, the camera main body including a second detection terminal adapted to come into contact with a first detection terminal of an electronic device;

a second power terminal to come into contact with a first power terminal of the electronic device to transfer power to the electronic device; and a first detection section adapted to detect the connection to the electronic device based on the change in the voltage of the second detection terminal, the electronic device including an actuator adapted to drive the electronic device;

the first detection terminal adapted to come into contact with the second detection terminal of the camera main body;

the first power terminal to come into contact with the second power terminal;

a second detection section adapted to detect the voltage of the first detection terminal;

a connection detection section adapted to detect the connection status to the camera main body based on the change in the voltage detected by the second detection section; and a control section adapted to control the operation of the actuator based on one of the connection to and the disconnection from the camera main body detected by the connection detection section, in which the electronic device is a replacement lens and the actuator drives a lens of the replacement lens, in which the first detection terminal and the first power terminal are separate from each other, and in which the connection detection section detects the connection status to the camera main body based on the change in the voltage of the first detection terminal detected by the second detection section such that the connection status is not based on a connection of the first power terminal to the second power supply terminal.

* * * * *